United States Patent [19]

Ooyama et al.

[11] Patent Number: 5,136,565
[45] Date of Patent: Aug. 4, 1992

[54] OPTICAL DEVICE FOR READING AND WRITING DATA ON A RECORDING MEDIUM

[75] Inventors: Noriyoshi Ooyama; Chikashi Yoshinaga; Ryoichi Kawasaki, all of Gunma, Japan

[73] Assignee: Sanyo Electric Co., Ltd., Osaka, Japan

[21] Appl. No.: 453,933

[22] Filed: Dec. 20, 1989

[30] Foreign Application Priority Data

| Dec. 20, 1988 | [JP] | Japan | 63-321081 |
| Sep. 4, 1989 | [JP] | Japan | 1-103631[U] |
| Sep. 4, 1989 | [JP] | Japan | 1-228570 |
| Sep. 11, 1989 | [JP] | Japan | 1-106401[U] |
| Sep. 28, 1989 | [JP] | Japan | 1-113897[U] |
| Oct. 5, 1989 | [JP] | Japan | 1-260758 |

[51] Int. Cl.$^5$ .................................................. G11B 7/00
[52] U.S. Cl. ............................... 369/44.14; 369/44.11; 369/32; 369/112
[58] Field of Search .......... 369/44.11, 44.12, 44.14, 369/44.16, 112, 122, 32, 112

[56] References Cited

U.S. PATENT DOCUMENTS

| 4,727,529 | 2/1988 | Araki et al. | 369/44.16 |
| 4,745,589 | 5/1988 | Nomura | 369/44.16 |
| 4,818,066 | 4/1989 | Nose | 369/44.16 |
| 4,912,693 | 3/1990 | Goda | 369/44.14 |
| 4,969,715 | 11/1990 | Nishihara et al. | 369/44.11 |
| 4,991,161 | 2/1991 | Ikegame et al. | 369/44.16 |
| 5,005,162 | 4/1991 | Mitsumori et al. | 369/44.12 |
| 5,022,022 | 6/1991 | Kikuchi et al. | 369/44.16 |

Primary Examiner—Roy N. Envall, Jr.
Assistant Examiner—Khoi Truong
Attorney, Agent, or Firm—Stanger, Michaelson, Spivak & Wallace

[57] ABSTRACT

A yoke constituting a magnetic actuator for driving an objective lens has a plurality of arms arranged in a plane intersecting the optical axis of the lens perpendicular thereto. An optical system including the objective lens is disposed at one side of the yoke and has the outer peripheral portion of the lens positioned partly in the space between adjacent two arms. The lateral width of the device is decreased by an amount corresponding to the lap of the lens over the yoke. A cover plate is secured to the upper surface of the magnetic actuator in intimate contact with the upper end faces of the yoke arms to give enhanced rigidity to the device.

6 Claims, 4 Drawing Sheets

OPTICAL DEVICE FOR READING AND WRITING DATA ON A RECORDING MEDIUM

FIELD OF THE INVENTION

The present invention relates to recording-reproduction apparatus for optically writing signals on recording media such as optical discs or optically reading signals from the recording medium, and more particularly to an optical pickup device having an objective lens and a magnetic actuator for positioning the lens with respect to the focusing direction to focus the lens and with respect to the tracking direction for proper tracking.

BACKGROUND OF THE INVENTION

The optical pickup device included in disc players for use with optical discs for signal recording or reproduction comprises a base movable radially of the disc, a lens holder carrying an objective lens and supported on the base shiftably in the focusing direction and tracking direction, electric coils mounted on the lens holder, and permanent magnets arranged on the base and opposed to the coils. The position of the objective lens relative to the optical disc is adjusted with respect to the above two directions by passing control current through the coils, whereby a beam emanating from the objective lens is focused on the signal bearing surface of the disc and caused to trace the signal track on the surface.

Unexamined Japanese Patent Publication SHO 63-244325 discloses such an optical pickup device. With reference to FIG. 6 showing the disclosed device, six yokes 101 are provided upright on a base 100. The four outer yokes are each provided with a permanent magnet 102 opposed to the inner yoke adjacent thereto, with a magnetic gap formed between the magnet 102 and the inner yoke. A focusing coil 103 and tracking coils 104 are arranged in the magnetic gaps with a clearance formed around each coil. These yokes 101, permanent magnets 102 and coils 103, 104 constitute a magnetic actuator, above which an objective lens 105 and a lens holder 106 are disposed. The coils 103, 104 are fixed to the lens holder 106, which in turn is shiftably supported on the base 100 by means of wires 107, 108.

A cover 109 provided over the magnetic actuator has secured thereto four iron pieces 110 each in intimate contact with the top faces the pair of yokes 101, 101 on opposite sides of the magnetic gap and with the top face of the magnet providing the gap to magnetically connect these members to one another.

With the optical pickup device of FIG. 6, the objective lens 105 is disposed above the magnetic actuator coaxially therewith and gives an increased thickness to the device, making it impossible to compact the device.

Unexamined Japanese Utility Model Publication SHO 59-36030 discloses an objective lens drive device which is similar to the above device in construction and therefore has the problem of a great thickness.

On the other hand, Unexamined Japanese Patent Publication SHO 61-139949 discloses an optical head wherein a lens holder is disposed at one side of a magnetic actuator to position a lens out of alignment with the actuator and thereby give a reduced thickness to the device. Nevertheless, this device has the problem of being larger sideways by an amount corresponding to the size of the lens holder since the holder is merely positioned beside the magnetic actuator which is of the conventional structure.

Unexamined Japanese Utility Model Publication SHO 62-120426 and Unexamined Japanese Patent Publication SHO 63-244325 disclose a pickup and an optical head device, respectively, which are of like construction and have the problem of being large-sized sidewise.

Further when the coils of the optical pickup device are energized for driving the objective lens, the coils produce Lorentz's force, and the yokes or magnets are similarly subjected to Lorentz's force, which is therefore likely to vibrate the yokes and magnets.

However, none of the devices disclosed in the foregoing publications have any means for preventing the vibration of the magnetic actuator, so that the vibration, if delivered to the optical system of the device, will inadvertently vibrate the objective lens, presenting difficulties in reading signals properly.

SUMMARY OF THE INVENTION

An object of the present invention is to provide an optical pickup device which can be compacted in its entirety.

Another object of the invention is to provide an optical pickup device having an effective vibration preventing structure.

The optical pickup device of the present invention comprises a magnetic actuator by which a lens holder holding an objective lens is driven in the focusing direction and in the tracking direction. The magnetic actuator comprises a yoke fixedly mounted on a base, at least one permanent magnet attached to the yoke, and a coil unit fixed to the lens holder. The yoke has a plurality of arms arranged in a plane intersecting the optical axis of the objective lens perpendicular thereto. The permanent magnet is disposed in the same plane as the arms of the yoke and opposed to the arms at a spacing therefrom. The coil unit is provided in a magnetic gap formed between the permanent magnet and the arms and is energized as controlled in accordance with focusing errors and tracking errors.

The optical system including the objective lens is disposed at a position sideways of the yoke in a direction perpendicular to the focusing direction, with the outer peripheral portion of the objective lens positioned partly in the space between adjacent two arms among the plurality of arms.

With the optical pickup device described above, the objective lens is disposed at one side of the yoke, as partly positioned in the space between the two adjacent arms. This arrangement makes it possible not only to reduce the thickness of the device axially of the lens but also to decrease the width thereof in the direction perpendicular to the optical axis of the lens by an amount corresponding to the lap of the lens over the yoke, whereby the device can be made small-sized in its entirety.

Further with the optical pickup device embodying the invention, the base has fixedly mounted thereon a frame for accommodating the lens holder with a clearance formed around the holder. The frame is provided with resilient support members for supporting the lens holder shiftably relative to the frame in the focusing direction and the tracking direction of the objective lens. The plurality of arms of the yoke constituting the magnetic actuator have upper end faces which are positioned on the same plane as the surface of the frame. A cover plate having high rigidity is secured to the upper end faces of the yoke arms and the surface of the frame in intimate contact therewith.

The cover plate imparts enhanced rigidity not only to the yoke but also to the entire pickup device, with the result that the device is given a satisfactory vibration resisting structure, which inhibits the vibration of the yoke and the magnet to be produced when the objective lens is driven, consequently preventing undesired vibration of the objective lens.

To support the lens holder shiftably relative to the frame, a plurality of wires are provided between the frame and the lens holder according to the invention. At least one of these wires differs from the other wires in characteristic frequency at which each wire singly vibrates freely.

With the optical pickup device described, it is unlikely that the plurality of wires will resonate at the same time. As a result, the influence of resonance can be smaller than when the plurality of wires are made identical in characteristic frequency. This inhibits the undesired vibration of the objective lens.

DETAILED DESCRIPTION OF EMBODIMENTS

Figure 1:
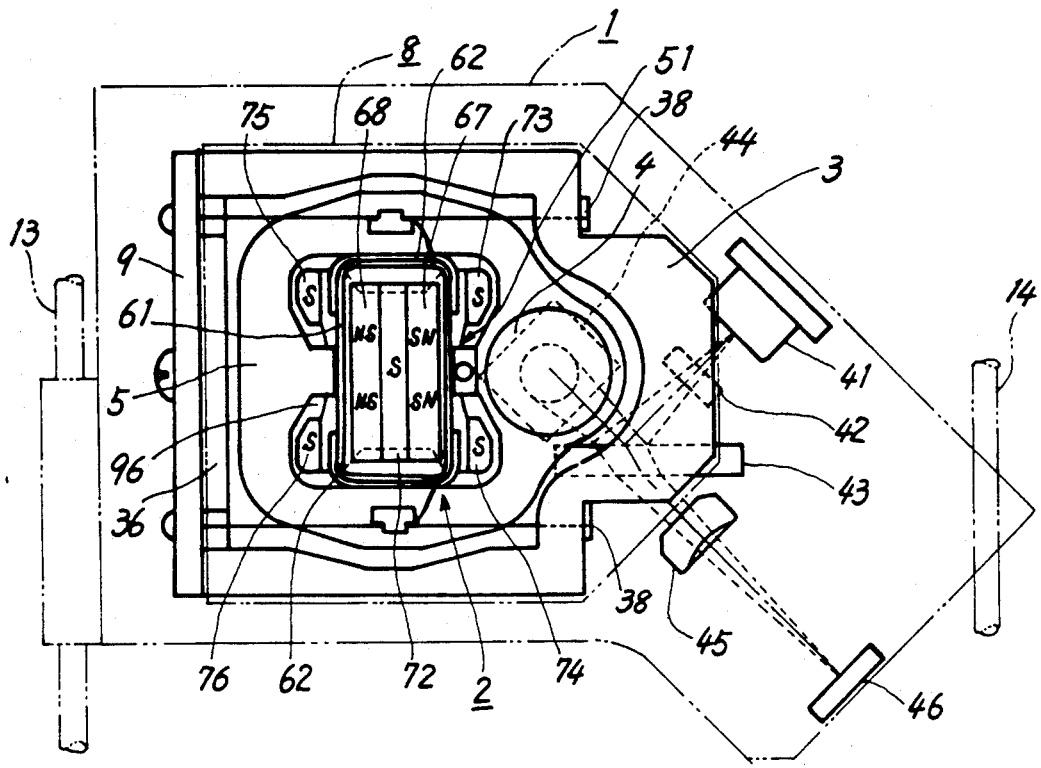
FIG. 1 is a plan view of an optical pickup device embodying the present invention.

Embodiments of the invention for use in disc players will be described below in detail with reference to FIGS. 1 to 5.

The optical pickup device shown in FIG. 1 comprises a base 1 movably supported by two guide shafts 13, 14 on a fixed chassis (not shown), a pickup assembly 2 provided with an objective lens 4 and the magnetic actuator to be described later, and a cover plate 8 fixed to the upper side of the pickup assembly 2. The base 1 is coupled to an unillustrated transport mechanism and reciprocatingly driven along the guide shafts 13, 14.

Figure 2:
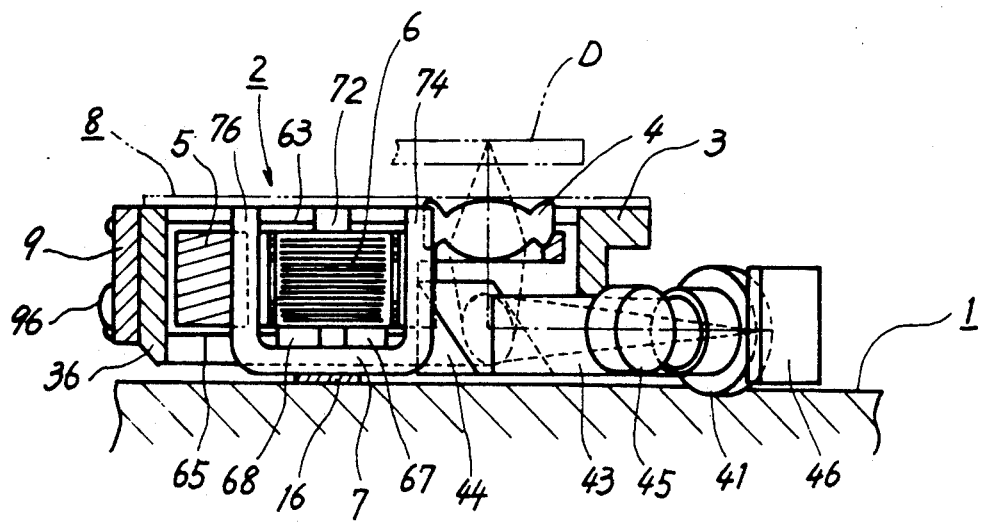
FIG. 2 is a side elevation partly broken away of the device.
Figure 3:
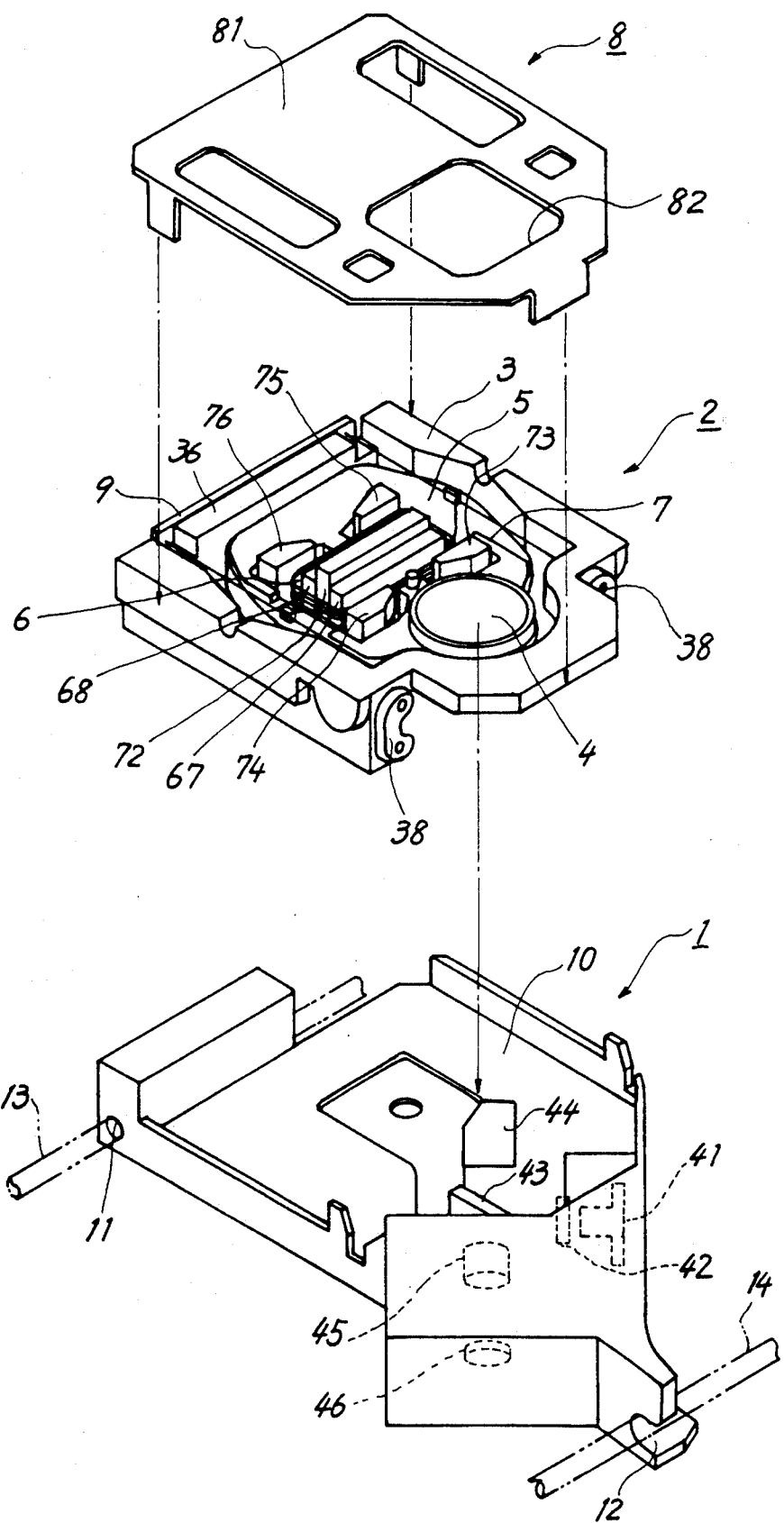
FIG. 3 is a perspective view showing the device as disassembled into a pickup assembly, a base and a cover plate.

As shown in FIG. 3, the base 1 is formed in opposite side portions of a bottom plate 10 with guide bore 11 and a guide groove 12 respectively having the guide shafts 13, 14 slidably extending therethrough. As seen in FIGS. 1 to 3, the base 1 has mounted thereon a laser diode 41, a diffraction grating 42 coaxial therewith, and a half mirror 43 disposed at the light emanating side of the grating 42 for forming divided optical paths and giving astigmatism to a passing light beam. Disposed on an optical path for the light reflected from the half mirror 43 is a reflecting mirror 44 for reflecting the light toward the objective lens 4. At the other side of the half mirror 43 opposite to the side where the grating 42 is disposed, a concave lens 45 is provided for adjusting the focused position of a modulated light beam incident thereon through the half mirror 43. Disposed at the light emanating side of the concave lens 45 is a photodetector 46 for converting the modulated light beam incident thereon to an electric signal.

Figure 4:
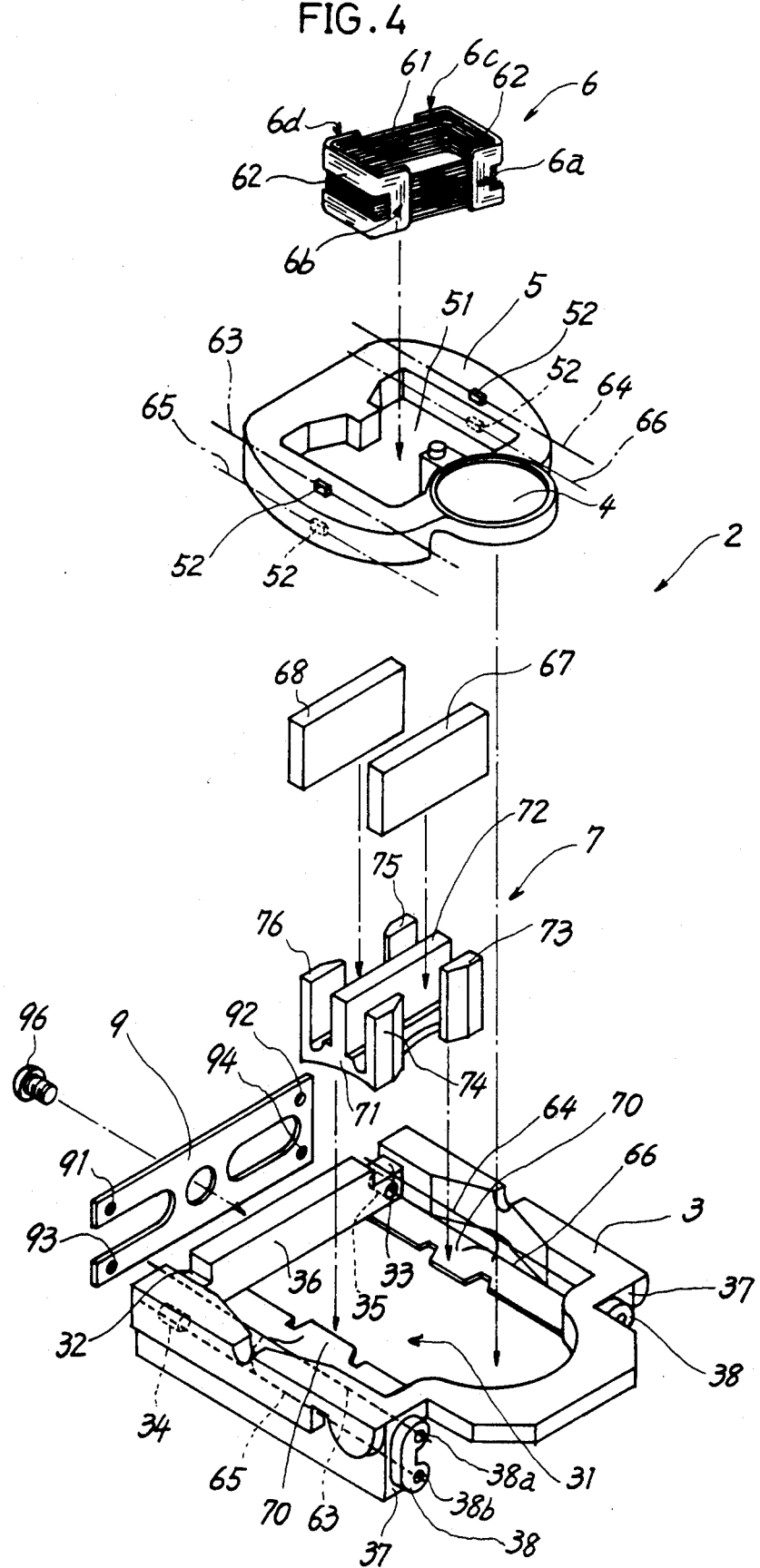
FIG. 4 is a perspective view showing the pickup assembly as disassembled into components.

Referring to FIG. 4, the optical pickup assembly 2 comprises a frame 3 fixedly mounted on the base 1, a yoke 7 fixed to the frame 3 centrally of a holder accommodating space 31 surrounded by the frame 3, a pair of striplike permanent magnets 67, 68 arranged on the yoke 7, the objective lens 4 for focusing the light from the reflecting mirror 44 on the signal bearing surface of a disc, a lens holder 5 for holding the objective lens 4, a coil unit 6 positioned in an actuator accommodating space 51 in the center of the holder 5 and fixedly adhered to the inner periphery of the holder 5, and wires 63, 64, 65, 66 for supporting the lens holder 5 on the frame 3 shiftably two-dimensionally.

As seen in FIG. 1, the objective lens 4 is disposed in a peripheral portion of the lens holder 5 and has its outer peripheral portion partly slightly projected toward the space 51.

As shown in FIG. 4, the lens holder 5 has four lugs 52 on the upper and lower faces of its frame portion on opposite sides of the lens 4 for fixing the respective wires 63 to 66 to the holder 5.

The coil unit 6 comprises a focusing coil 61 having four sides and in the form of a rectangular tube, and a pair of tracking coils 62, 62 so bent as to cover opposed two sides of the focusing coil 61, respectively, over the corners of each side and adhered to the coil 61 in combination as illustrated. Consequently, the laps of the tracking coils 62, 62 over the focusing coil 61 have four regions 6a, 6b, 6c, 6d where the conductors of the two different coils intersect each other at right angles. The conductors of the tracking coils 62, 62 are continuous with each other.

The yoke 7 comprises arms 73, 74, 75, 76 extending upright from the four corners of a substantially rectangular bottom plate 71, and a striplike center plate 72 provided upright on the centeral portion of the bottom plate 71 and extending longitudinally thereof. These arms 73 to 76 and the center plate 72 have the same height.

The pair of permanent magnets 67, 68 are secured to the respective side faces of the yoke center plate 72 in intimate contact therewith. The magnets 67, 68 as attached to the yoke 7 have a slightly smaller height than the center plate 72. These permanent magnets 67, 68 have, for example, an S pole on the center plate side and an N pole on the arm side, with the result that the center plate 72 and the arms 73 to 76 are magnetized to an S pole as seen in FIG. 1.

Consequently, separate four magnetic gaps are formed between the respective yoke arms 73, 74, 75, 76 and the permanent magnet 67 or 68 adjacent to the arm.

As shown in FIG. 4, the holder accommodating space 31 of the frame 3 is made larger than the contour of the holder 5, with the result that the lens holder 5 as accommodated in the space 31 is allowed to move in a plane perpendicular to the optical axis of the objective lens 4 as seen in FIG. 3. The frame 3 is formed with portions 70, 70 for positioning the yoke 7 in place as shown in FIG. 4.

A printed board 9 fastened to the outer surface of a rear plate 36 of the frame 3 has four terminals 91, 92, 93, 94 electrically connected to the focusing coil 61 and the tracking coils 62, 62. The frame rear plate 36 is formed with wire passing grooves 32, 33 and wire passing holes 34, 35 larger than the diameter of the wires 63 to 66 and corresponding to the respective terminals 91, 92, 93, 94 on the printed board 9. A pair of front plates 37, 37 opposed to the respective ends of the frame rear plate 36 are each fixedly provided on its outer surface with a wire holding member 38 having a pair of upper and lower wire fixing portions 38a, 38b.

The wires 63, 64, 65, 66, which are electrically conductive and made for example of phosphor bronze, extend respectively from the four terminals 91, 92, 93, 94 on the printed board 9 fixed to the frame 3 to the four wire fixing portions 38a, 38a, 38b, 38b of the wire holding members 38, 38 corresponding to the terminals. The frame front plates 37, 37 and the wire holding members 38, 38 are formed with holes similar to the wire passing holes 34, 35 for passing the wire therethrough. Accordingly, the wires 63 to 66 are provided between the printed board 9 and the wire holding members 38, 38 at opposite sides, as held out of contact with the frame 3.

The lens holder 5 is resiliently supported as accommodated in the space 31 of the frame 3 in suspension by the four wires 63 to 66, with the four lugs 52 soldered to the respective four wires 63 to 66 approximately at the midportion of each wire.

Four lead wires extending from the focusing coil 61 and the tracking coils 62, 62 of the coil unit 6 are soldered to the respective wires 63 to 66 at the positions of the lugs 52 on the lens holder 5, whereby the coils are electrically connected to the terminals 91, 92, 93, 94 on the printed board 9 by the wires 63, 64, 65, 66. These terminals 91 to 94 are connected to a control circuit (not shown) for controlling the energization of the focusing coil 61 and the tracking coils 62, 62.

The yoke 7 having the permanent magnets 67, 68 secured thereto is fixedly adhered to the yoke positioning portions 70, 70 of the frame 3, and the lens holder 5 carrying the coil unit 6 is then accommodated in the space 31 of the frame 3. At this time, the lens holder 5 is accommodated in an annular space between the yoke 7 and the frame 3, with a clearance formed around the holder 5 and also around the yoke 7, and the coil unit 6 is loosely positioned between the assembly of magnets 67, 68 and the arms 73 to 76. Consequently, the abovementioned four regions 6a, 6b, 6c, 6d where the tracking coils 62, 62 intersect the focusing coil 61 are arranged in the respective magnetic gaps between the arms 73 to 76 and the magnets 67, 68.

Furthermore, the objective lens 4 is accommodated in a space between the inner periphery of the frame 3 and the two yoke arms 73, 74 close to the lens 4, with the result that the outer peripheral portion of the lens 4 closer to the yoke 7 is positioned in the space between the two arms 73, 74.

The cover plate 8 is made of a metal or synthetic resin material having high rigidity and attached to the upper side of the pickup assembly 2. As seen in FIGS. 2 and 3, the plate 8 has a top plate portion 81 in intimate contact with the upper end faces of the arms 73 to 76 and the center plate 72 of the yoke 7. The outer peripheral portion of the plate 8 is fixedly adhered to the upper surface of the frame 3. In the case where the cover plate 8 is made of a magnetic material, the top plate portion 81 is magnetically fixed to the yoke 7, while when the cover plate 8 is made of a non-magnetic material, the top plate portion 81 is fixedly adhered to the arms 73 to 76.

If the cover plate 8 is made of the magnetic material, the plate 8 forms magnetic paths extending from the upper end of the yoke center plate 72 to the upper ends of the respective arms 73 to 76. This serves to diminish the leakage of magnetic fluxes from the magnetic gaps.

With reference to FIG. 3, the pickup assembly 2 is installed on the upper side of the bottom plate of the base 1, with a damper 16, for example, of butyl rubber interposed between the bottom of the yoke 7 and the surface of the base 1 as seen in FIG. 2. The frame 3 is fixed to the base 1 by unillustrated fasteners such as screws.

When the pickup assembly 2 is mounted on the base 1, one end of the reflecting mirror 44 on the base 1 is positioned in the space between the two yoke arms 73, 74 closer to the objective lens 4.

The optical pickup device thus assembled is moved along the guide shaft 13, 14 shown in FIG. 1 radially of a disc D in rotation to detect the signals recorded on the disc D. For this operation, the laser diode 41 emits a light beam, which is divided upon diffraction by the diffraction grating 42 into three beams, i.e., a single primary beam and two secondary beams, which are then reflected by the half mirror 43 toward the reflecting mirror 44 and further reflected at the mirror 44 toward the objective lens 4, which in turn projects a converged beam on the signal bearing surface of the disc D, whereby the beam is modulated in accordance with the recorded signals.

The modulated light beam reflected from the disc passes through the objective lens 4 again, impinges on the reflecting mirror 44 and passes through the half mirror 43 upon reflection at the mirror 44. At this time, the beam is subjected to astigmatism in accordance with the thickness and refractive index of the half mirror 43 and the angle of incidence thereon. The beam passing through the half mirror 43 impinges on the photodetector 46 via the concave lens 45.

Based on the detected signals from the photodetector 46, the data signals recorded on the disc are reproduced, and a focusing error signal and a tracking error signal are prepared. A control current in accordance with the focusing error signal is passed through the focusing coil 61, while a control current in accordance with the tracking error signal is passed through the tracking coils 62, 62. Consequently, the coil unit 6 is subjected to a magnetic force, and the lens holder 5 connected to the coil unit 6 is driven against the resilient supporting force of the wires 63 to 66 to shift the objective lens 4 in the focusing direction (upward or downward in FIG. 2) and in the tracking direction (upward or downward in FIG. 1), whereby the focusing error and tracking error are corrected.

In the case of the optical pickup device described above, the objective lens 4 is positioned at one side of the magnetic actuator without lapping over the actuator axially of the lens as seen in FIGS. 1 and 2. This arrangement gives a reduced thickness to the device. Moreover, with the objective lens 4 and the reflecting mirror 44 positioned locally in the space between the two adjacent arms 73, 74, the right-to-left width of the device as shown in FIG. 1 can be decreased by an amount corresponding to the lap of the lens 4 and the mirror 44 over the yoke 7. Consequently, the device can be made small-sized in its entirety.

The arms 73, 74, 75, 76 of the yoke 7 are provided as opposed to the respective intersecting regions of the focusing coil 61 and the tracking coils 62, 62, whereby the magnetic fluxes from the permanent magnets 67, 68 can be caused to act effectively on the intersecting regions, giving improved sensitivity to the magnetic actuator. Furthermore, the permanent magnets 67, 68 have a sufficient size to extend over the adjacent two magnetic gaps and can therefore produce a sufficient quantity of magnetic flux, which can be concentrated on the magnetic gaps to effectively act on the two kinds of coils.

The top plate portion 81 of the cover plate 8 is secured to the upper end faces of the arms 73 to 76 and the center plate 72 of the yoke 7 in intimate contact therewith, and the peripheral portion of the cover plate 8 is intimately fixed to the upper surface of the frame 3. The cover plate 8 accordingly imparts enhanced rigidity no only to the yoke 7 itself but also to the entire pickup device, whereby the pickup device is given a satisfactory vibration resisting structure. Additionally, the damper 16 interposed between the yoke 7 and the base 1 absorbs the vibrating force on the yoke 7, so that the vibration due to the influence of the magnetic force of the actuator can be attenuated promptly.

The wires 63 to 66 shiftably supporting the lens holder 5 extend through the grooves 32 or 33 or holes 33 or 34 formed in the frame 3 without contacting the frame, has their opposite ends fixed to the printed board 9 and the wire holding members 38, 38 and consequently have a longer length than when the wire ends are fixed directly to the wall faces of the frame 3. This establishes a more linear relationship between the drive force produced in the magnetic actuator and the amount of shift of the lens holder 5, decreases the characteristic frequency of the means for resiliently supporting the lens holder 5 and thereby prevents the undesired vibration of the objective lens 4.

Figure 5:
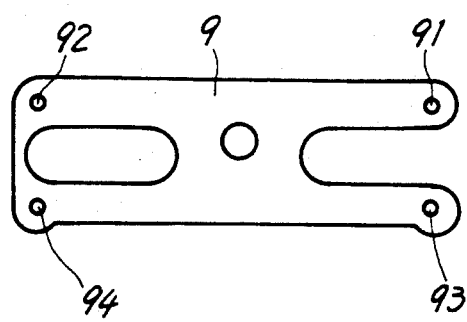
FIG. 5 is a front view of a printed board included in another embodiment.
Figure 5A:
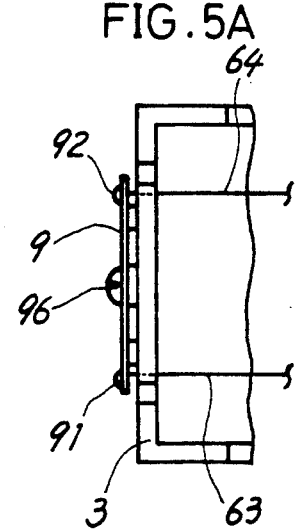
FIG. 5A is a plan view showing the printed board of FIG. 5 as installed in place.
Figure 6:
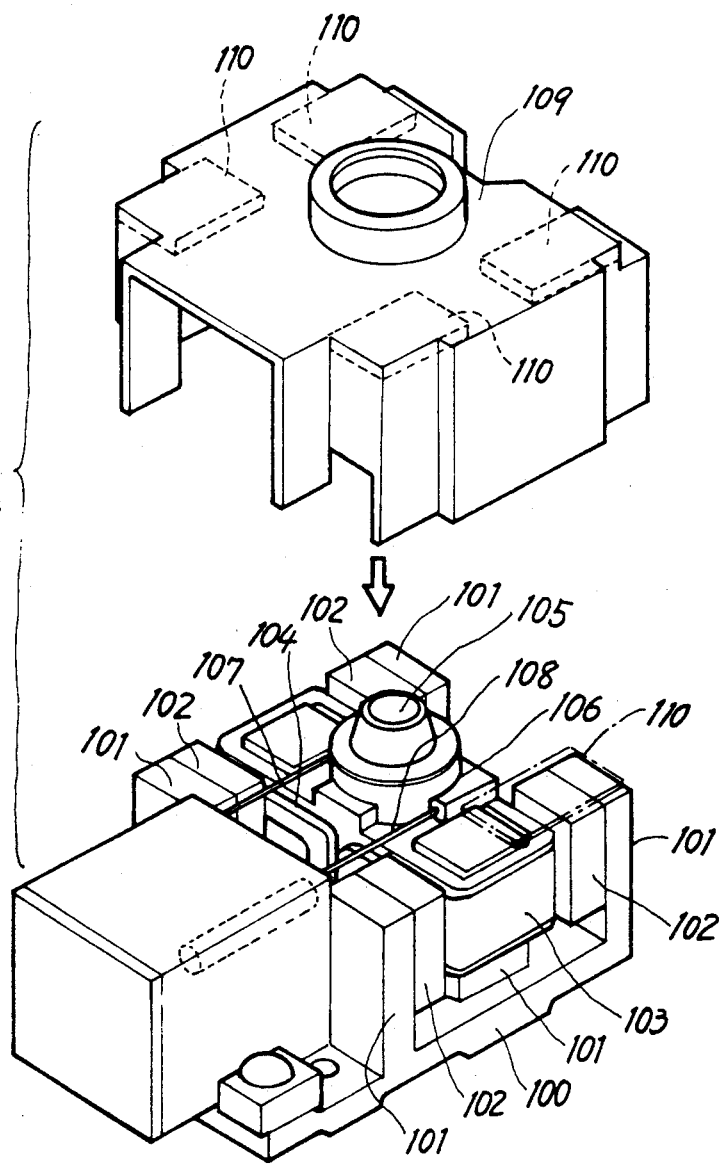
FIG. 6 is a perspective view of a conventional device.

The vibration of the objective lens due to the magnetic influence can be prevented more effectively by forming opposite ends of the printed board 9 carrying the terminals 91 to 94 in different shapes as shown in FIG. 5 and disposing the printed board 9 at a distance from the outer surface of the frame 3 as shown in FIG. 5A so as to impart different elastic properties to the board 9 in the vicinity of the respective terminals 91 to 94. With the elastic deformation of the printed board 9 thus taken into consideration, the wires 63, 64, 65, 66 can be made different from one another in characteristic frequency. Since the four wires 63 to 66 are then unlikely to resonate at the same time, the above arrangement serves to diminish the influence of resonance that would result when the wires are made identical in characteristic frequency. In addition, the overall characteristic frequency of the structure for elastically supporting the lens holder 5 by the wires and the printed board 9 can be made greatly different from the objective lens drive frequency for tracking control or focus control to thereby inhibit the resonance of the objective lens 4.

The wires 63 to 66 can be made different in resonance frequency effectively also by making the wires per se from materials which are different in modulus of elasticity or by making the wires different in diameter. Furthermore, the same effect as above is available by setting the four wires to two different characteristic frequencies. To make the two adjacent wires different in characteristic frequency in this case, it is useful to make the two diagonally opposed wires identical in characteristic frequency.

The above description of embodiments is given for the illustration of the present invention and should not be construed as limiting the claimed invention or reducing the scope thereof. Furthermore, the construction of the present device is not limited to those of the above embodiments but can of course be modified variously by one skilled in the art without departing from the scope of the invention as set forth in the appended claims.

What is claimed is:

1. An optical pickup device for projecting a light beam on a signal recording medium to optically read signals from the medium or optically write signals thereon, the device comprising an optical system including an objective lens for focusing the light beam on the recording medium, a lens holder for holding the objective lens, means for supporting the lens holder on a base shiftably in the focusing direction and the tracking direction of the objective lens, and a magnetic actuator for driving the lens holder in the focusing direction and the tracking direction, the magnetic actuator comprising a yoke fixedly mounted on the base and having a plurality of arms arranged in a plane intersecting the optical axis of the objective lens perpendicular thereto, at least one permanent magnet secured to the yoke and disposed in the same planes as and opposed to the arms at a spacing therefrom, and a coil unit fixed to the lens holder and provided in a magnetic gap formed between the permanent magnet and the arms, the coil unit being adapted to be energized as controlled in accordance with a focusing error signal and a tracking error signal to move the lens holder, characterized in that;

the coil unit includes a focusing coil to be energized in accordance with the focusing error signal and tracking coils to be energized in accordance with the tracking error signal and lapping over the focusing coil to form at the laps thereof a plurality of regions where the conductors of the two kinds of coils intersect each other, the plurality of arms being opposed to the respective intersecting regions, the plurality of intersecting regions of the coil unit being provided respectively in a plurality of magnetic gaps formed between the permanent magnet and the arms so as to concentrate magnetic flux to the intersecting regions, the optical system being disposed adjacent the yoke in a direction perpendicular to the focusing direction and having an outer peripheral portion of the objective lens extending into a space between two of the plurality of arms.

2. An optical pickup device as defined in claim 1 wherein the permanent magnet extends over adjacent two magnetic gaps among the plurality of magnetic gaps.

3. An optical pickup device for projecting a light beam on a signal recording medium to optically read signals from the medium or optically write signals thereon, the device comprising an optical system including an objective lens for focusing the light beam on the recording medium, a lens holder for holding the objective lens, a frame fixedly mounted on a base and a accommodating the lens holder with a clearance formed around the holder, resilient support members supporting the lens holder shiftably relative to the frame in the focusing direction and the tracking direction of the objective lens, and a magnetic actuator for driving the lens holder in the focusing direction and the tracking direction, the magnetic actuator comprising a yoke fixedly mounted on the base and having a plurality of arms arranged in a plane intersecting the optical axis of the objective lens perpendicular thereto, the arms having end faces positioned on the same plane as the surface of the frame, at least one permanent magnet secured to the yoke and disposed in the same plane as and opposed to the arms at a spacing therefrom, and a coil unit fixed to the lens holder and provided in a magnetic gap formed between the permanent magnet and the arms, the coil unit being adapted to be energized as controlled in accordance with a focusing error signal and a tracking error signal to move the lens holder, characterized in that;

a cover plate of a magnetic material and secured to the end faces of the yoke arms and the surface of the frame in intimate contact therewith so as to decrease stray magnetic flux from a magnetic circuit formed by the cover plate and the arms of the yoke and also to increase rigidity of the frame.

4. An optical device pickup device as defined in claim 3 wherein the cover plate has a top plate portion covering approximately the entire surface of the yoke.

5. An optical pickup device as defined in claim 3 wherein a damper for absorbing the vibration of the yoke is interposed between the yoke and the base.

6. An optical device for projecting a light beam on a signal recording medium to optically read signals from the medium or optically write signals thereon, the device comprising an optical system including an objective lens for focusing the light beam on the recording medium, a lens holder for holding the objective lens, a frame fixedly mounted on a base and accommodating the lens holder with a clearance formed around the holder, resilient support means supporting the lens holder shiftably relative to the frame in the focusing direction and the tracking direction of the objective lens, and a magnetic actuator for driving the lens holder in the focusing direction and the tracking direction, characterized in that;

said frame having opposite portions, the resilient support means comprising a plurality of wires extending between the opposite portions of the frame and supporting the lens holder, at least one of the wires being different from the other wires in characteristic frequency at which each wire singly vibrates freely, the opposite portions of the frame for the respective wires extending from the lens holder to having a clearance for passage of the wires therethrough, and a holding portion provided outside the frame for holding the wires passing through the frame at the vicinity of the clearances.

* * * * *